G. R. DELAMATER.
SINK AND FLOAT TESTING APPARATUS.
APPLICATION FILED JULY 3, 1909.
961,846.
Patented June 21, 1910.
3 SHEETS—SHEET 1.
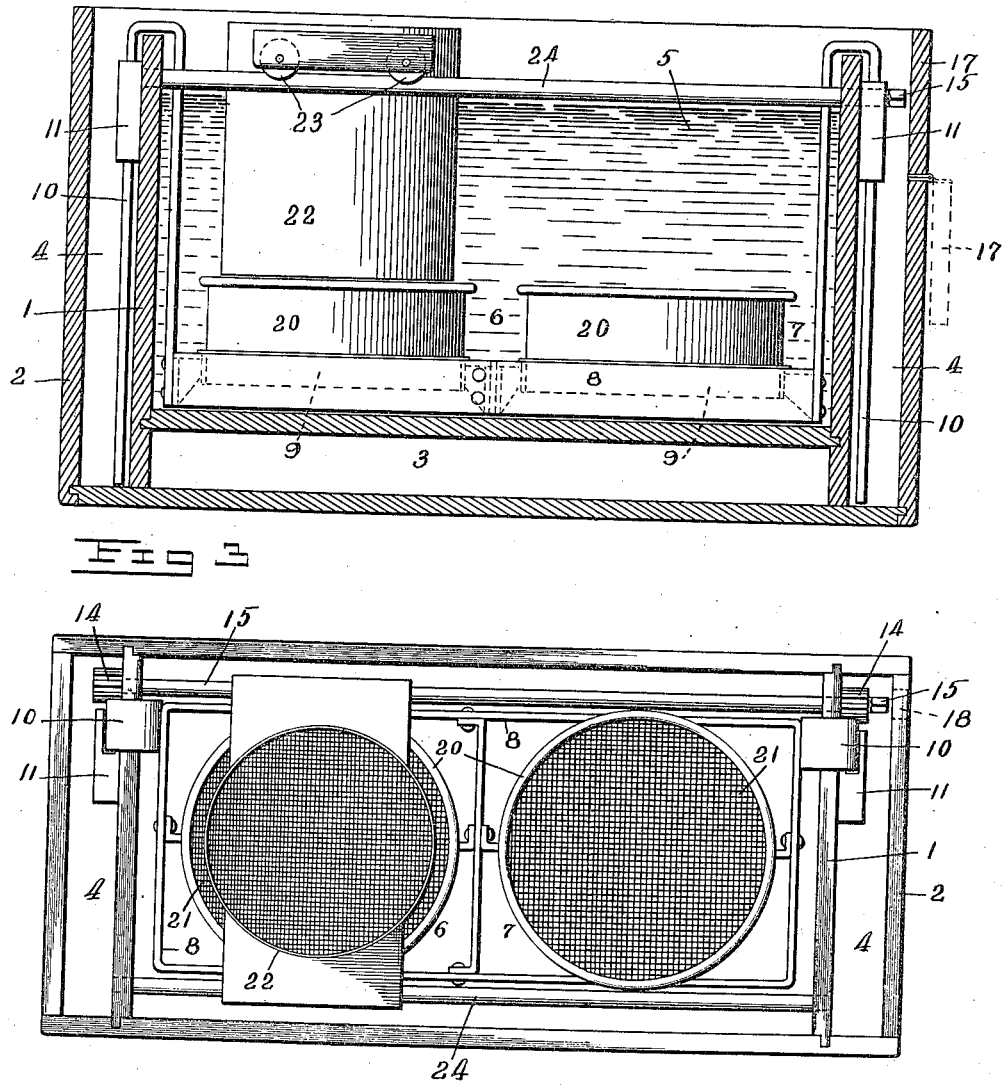
Witnesses
H. A. Robinett
E. M. Evlford
Inventor
George R. Delamater
By Meyers, Cushman & Rea
Attorney G. R. DELAMATER.
SINK AND FLOAT TESTING APPARATUS.
APPLICATION FILED JULY 3, 1909.
961,846.
Patented June 21, 1910.
3 SHEETS—SHEET 2.
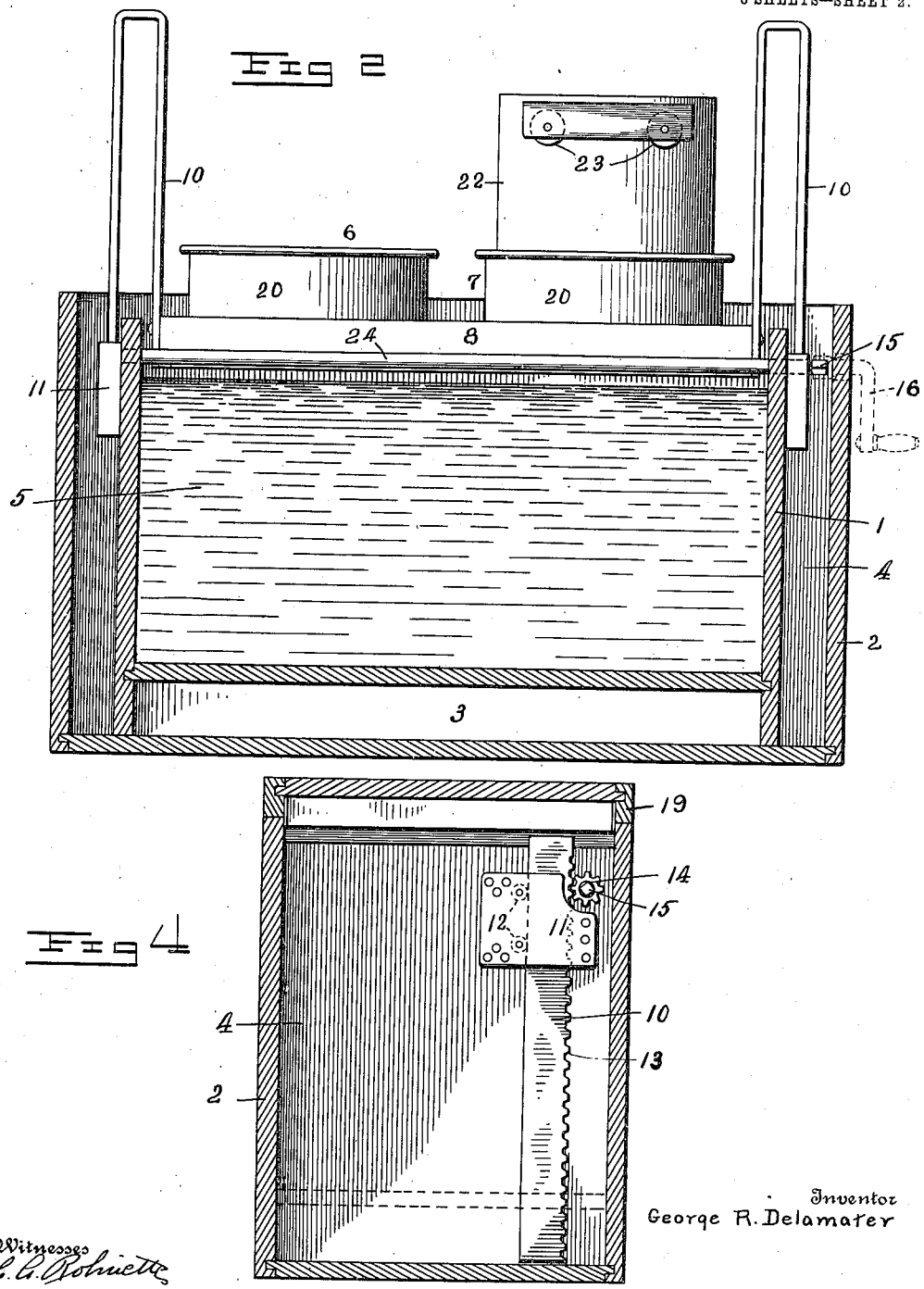

G. R. DELAMATER.
SINK AND FLOAT TESTING APPARATUS.
APPLICATION FILED JULY 3, 1909.
961,846.
Patented June 21, 1910.
3 SHEETS—SHEET 3.
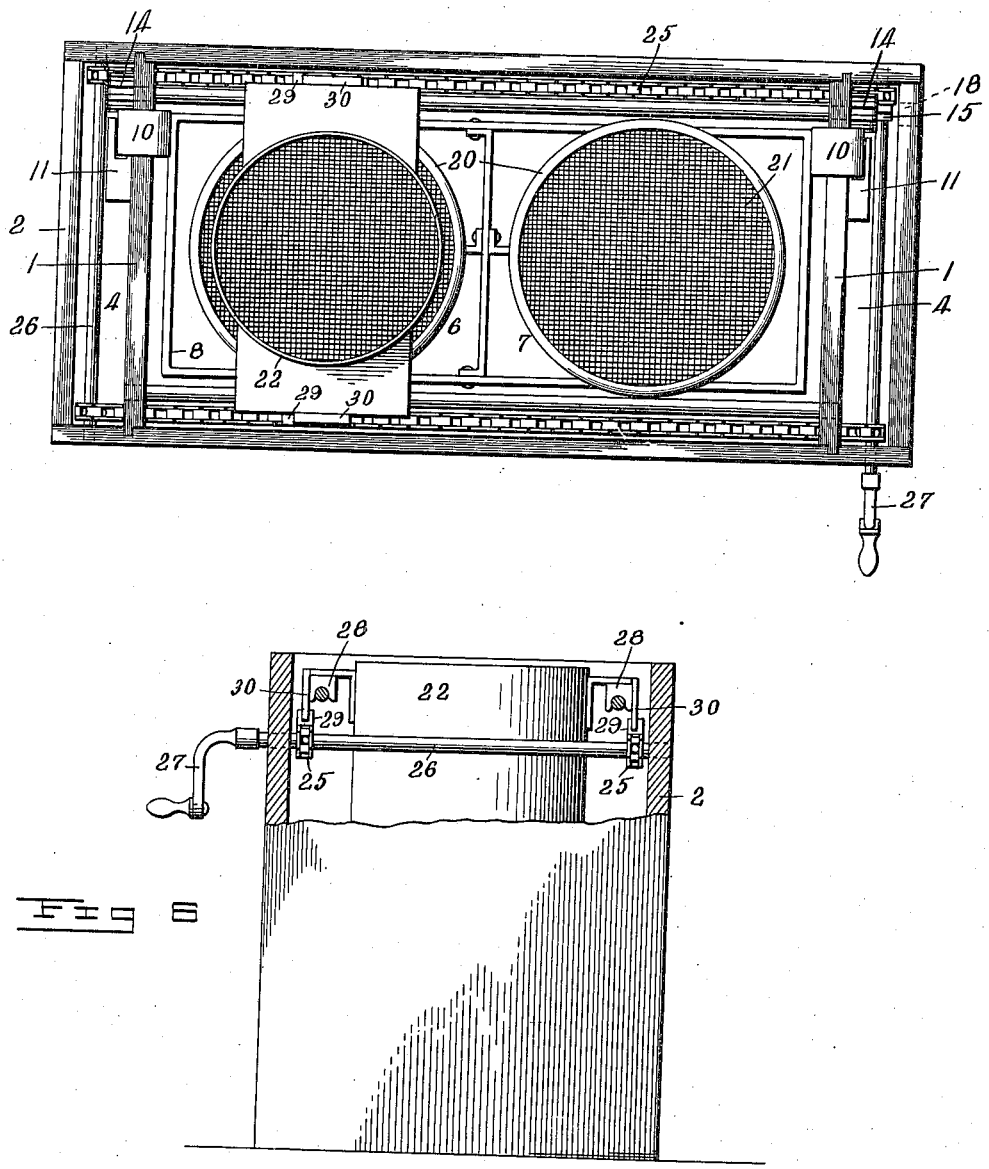
Witnesses
H. G. Robinetto
E. M. Colford
Inventor
George R. Delamater
By Meyers, Cushman & Rea
Attorney

UNITED STATES PATENT OFFICE.

GEORGE R. DELAMATER, OF STRONG, COLORADO.

SINK-AND-FLOAT TESTING APPARATUS.

961,846.

Specification of Letters Patent. Patented June 21, 1910.

Application filed July 3, 1909. Serial No. 505,943.

*To all whom it may concern:*

Be it known that I, GEORGE R. DELAMATER, a citizen of the United States, residing at Strong, in the county of Huerfano and State of Colorado, have invented new and useful Improvements in Sink-and-Float Testing Apparatus, of which the following is a specification.

My invention relates to improvements in apparatus for practicing what is known as the "sink and float" method of testing, particularly applicable to testing coal.

The "sink and float" method of testing coal consists in the act of introducing a sample of coal into what is known as a "specific gravity solution," such as zinc chlorid, in which that proportion of the sample which is of greater specific gravity than the solution will sink therein, and that which is lighter will float. The relative proportion of that which sinks and that which floats can easily be ascertained by weight, and from the knowledge thus obtained various information is derivable, such as the value of the coal for specific purposes, or whether a coal washer or other machine of a coal treating plant is operating efficiently or with needless loss of valuable coal in the refuse. The float proportion of the coal, in the sink and float test, is segregated so that it may be analyzed for various purposes.

Heretofore the practice has been to introduce a sample of coal into a specific gravity solution, and remove the float by skimming it off. Such practice is slow and practically impossible of utilization in a commercial way. With my apparatus such tests may be made much more rapidly and with greater facility and certainty, and the specific gravity solution may be utilized over and over again.

The invention resides in apparatus hereinafter described, and shown in the drawings, which illustrate that which I regard as the best known embodiment of my invention.

That which is claimed as new will be set forth in the claims appended to the description.

In the accompanying drawings—Figure 1 is a central sectional view of the apparatus. Fig. 2 is a similar view of the apparatus with parts in different position. Fig. 3 is a top plan view. Fig. 4 is an end elevation, the end wall of the box or casing being omitted; and Fig. 5 is a plan view showing mechanical means for moving the float transferrer, and Fig. 6 is an end view showing the engagement of the float transferrer with the said moving means, a portion of the wall of the tank being broken away.

In the said drawing, the reference numeral 1 designates a tank, preferably, although not necessarily, located in a box or casing 2, which affords a space 3 beneath the tank in which drawers containing utensils may be stored, and end compartments 4 in which certain parts are located and protected from injury.

The tank may be made of any suitable material, such as wood, zinc lined, and is adapted to contain a specific gravity solution, such as zinc chlorid 5. Movably arranged in the tank are sink and float collectors 6 and 7, consisting, in the illustrated example of invention, of sieves supported upon a frame 8 having rings 9 in which the collectors are removably seated. The frame 8, and the collectors supported thereon, may be raised and lowered by any suitable means. As shown, the frame is provided with inverted U-shaped straps 10, the outer legs of which are located in the compartments 4 and work through guides 11 secured to the walls of the tank and preferably provided with rollers 12 to bear against said legs and afford ease of guided movement of the latter. One face of the outer legs of each of said straps 10 is provided with a rack 13 with which pinions 14 carried by a pinion shaft 15 engage. The pinion shaft at one end is formed to receive a crank 16, whereby the pinions may be rotated and the collectors 6 and 7 raised or lowered in the tank through the medium of the straps 10. The gist of this part of the apparatus is that there are two collectors, one for the sink and the other for the float, movably arranged in the tank, and means for raising and lowering them therein, irrespective of the particular character of such raising and lowering means.

As shown an end wall of the box or casing is provided with a hinged section 17 which may be lowered, as shown by dotted lines, Fig. 1, to permit the crank to be engaged with the pinion shaft, or said wall of the box or casing may be provided with an opening 18, as shown in Fig. 2, through which the crank arm may be passed into engagement with the pinion shaft. When the hinged section is used it is held in upright position by means of a cover 19 when the latter is closed, and may be opened out to the dotted line position shown in Fig. 1 when the cover is opened.

The collectors shown consist of sieves comprising pans 20 provided with sieve bottoms 21, such bottoms of sixty mesh brass cloth having been found in practice suitable, but which may be of any other desired degree of fineness or character.

A float transferrer 22 is movably supported in the tank, so that it may be shifted from a position coöperating with the sink collector 6 to a position coöperating with the float collector 7. As shown, said transferrer is supported and adapted to run on tracks above the collectors, by means of over-running trolleys 23 resting on said tracks. In the illustrated example of the invention the pinion shaft 15 constitutes one of said tracks, the other being designated by the numeral 24. The float transferrer consists of an open ended cylinder which may be of thin metal and is of a diameter slightly less than the diameter of the collector pans, as shown. The float transferrer in addition to being capable of being shifted from one to the other of the collector pans, is capable also of being vertically moved as shown in Fig. 2.

According to the arrangement shown in Fig. 1 it is designed that the float transferrer shall be shifted from one to the other collector manually by pushing the same upon the tracks, but obviously this may be accomplished by aid of mechanical means, one simple way being illustrated in Figs. 5 and 6 of the drawing, wherein the shifting is accomplished by means of cables 25 trained over drums on shafts 26 operable by means of a suitable handle 27, and having lugs 29 to engage arms 30 attached to the float transferrer. In said Figs. 5 and 6 the float transferrer 22 is movably supported on the tracks 15 and 24 by means of shoes 28 instead of the trolleys illustrated in the other figures of the drawing. I regard it preferable to shift the float transferrer with the aid of suitable mechanical contrivance, as it is desirable to move the same slowly from the sink collector 6 to the float collector 7.

In practicing the sink and float method of testing with my apparatus, the tank is supplied with a suitable specific gravity solution, the float transferrer is moved to the position over the sink collector 6 as shown in Fig. 1; the collector is then raised until the pan thereon incloses the lower open end of the float transferrer. A sample of coal, crushed or ground to a suitable fineness, is now introduced into the float collector, the heavier particles sinking and being collected by the sieve bottom of the sink collector, and the lighter particles floating in the solution within the float transferrer. To facilitate the sink and float separation, stirring or agitation may be resorted to. After the heavier particles have settled in the collector 6 the latter is lowered leaving the float transferrer free, whereupon the said transferrer, with the float proportion of the sample confined therein, floating in the specific gravity liquid, is slowly and carefully shifted to a position over the float collector 7, whereupon this collector is elevated, inclosing the lower upper end of the float transferrer. The lifting movement is continued until the collector and transferrer are raised clear out of the solution, as shown in Fig. 2. During this operation the solution in the transferrer will have passed through the sieve bottom of the collector, but the floating material will be retained in the collector. The sink collector 6 will also have been raised clear of the solution, retaining therein the sink proportion of the sample, the solution escaping through the sieve bottom. The collectors may then be removed from the frame 8, the proportion of each determined, and calculations or analysis, or both, of the value of the coal for specific purposes, or for correction of fault in the operation of coal washing apparatus, or other apparatus in the coal treating plant, may be made.

The solution may be used for many tests during a long period of time, as there is substantially no loss or contamination thereof.

I have set forth the apparatus of my invention applied to one valuable use thereof. The apparatus may be, and likely is, useful for other purposes, and I desire to be understood as claiming it for all the uses of which it is capable.

Having thus described my invention, what I claim is:

1. A sink and float testing apparatus, comprising a tank, a collector for the sink and a collector for the float in said tank, and a movably supported float transferrer adapted to be moved into coöperative relation with said collectors to deposit the sink in the sink collector and transfer the float to the float collector.

2. A sink and float testing apparatus, comprising a tank, a collector for the sink and a collector for the float in said tank, and a movably supported float transferrer having an open bottom and adapted to be moved into coöperative relation with said collectors to deposit the sink in the sink collector and transfer the float to the float collector.

3. A sink and float testing apparatus, comprising a tank to contain a specific gravity solution, a collector for the sink material and a collector for the float material in said tank, a movably supported float transferrer adapted to be moved into coöperative relation with said sink material collector to deposit the sink in said collector and with said float material collector to transfer the float thereto, and means for lifting said collectors and said transferrer out of the specific gravity solution in the tank, substantially as described.

4. A sink and float testing apparatus, comprising a tank adapted to contain a specific gravity solution, a movable frame arranged in said tank, a sink material collector and a float material collector supported by said frame, a float transferrer movably supported and adapted to be moved into coöperative relation with said collectors, and means for raising said collectors and float transferrer out of the specific gravity solution in the tank.

5. A sink and float testing apparatus, comprising a tank, sink material and float material collectors movably supported in said tank and comprising pans having sieve bottoms, a float material transferrer movably supported in said tank above said collectors and adapted to be moved into coöperative relation with either thereof, and means for raising said collectors and said transferrer out of the solution in the tank.

6. A sink and float testing apparatus, comprising a tank, a frame movably arranged in said tank, a sink collector sieve and a float collector sieve removably carried by said frame, tracks extending across the tank above said collectors, a float transferrer movable on said tracks and adapted to be moved into coöperative relation with either of said collectors, and means for elevating said collectors and said transferrer out of the specific gravity solution in the tank.

7. A sink and float testing apparatus comprising a tank, a sieve supporting frame movably arranged in said tank and provided with inverted U-shaped straps one leg of which extends outside the tank, means engaging the said straps for raising and lowering the frame, a sink material collector sieve and a float material collector sieve movably supported by said frame, tracks extending across the tank above said collector sieves, and a float material transferrer movably arranged on said tracks and adapted to be brought into coöperative relation with either of said sieves.

8. A sink and float testing apparatus, comprising a tank adapted to contain a specific gravity solution, a sink material collector, a float material collector movably arranged in said tank, a float material transferrer of less diameter than said collectors, movably arranged above the said collectors and adapted to be moved into coöperative relation with either thereof, means for moving the collectors with relation to the float transferrer to inclose the lower end of the latter and to lift said collectors and transferrer out of the specific gravity solution in the tank, substantially as described.

In testimony whereof I have hereunto set my hand in presence of two subscribing witnesses.

GEORGE R. DELAMATER.

Witnesses:
GUY R. SHULL,
JAMES M. NORRIS.